United States Patent
Zhang et al.

(10) Patent No.: US 11,370,886 B2
(45) Date of Patent: Jun. 28, 2022

(54) POLYMER WITH LOW DIELECTRIC CONSTANT AND MOLECULAR STRUCTURE DESIGN METHOD CAPABLE OF REDUCING DIELECTRIC CONSTANT OF POLYMER

(71) Applicant: SUN YAT-SEN UNIVERSITY, Guangzhou (CN)

(72) Inventors: Yi Zhang, Guangzhou (CN); Chao Qian, Guangzhou (CN); Jiarui Xu, Guangzhou (CN); Runxin Bei, Guangzhou (CN); Siwei Liu, Guangzhou (CN); Zhenguo Chi, Guangzhou (CN)

(73) Assignee: SUN YAT-SEN UNIVERSITY, Guangzhou (CN)

( * ) Notice: Subject to any disclaimer, the term of this patent is extended or adjusted under 35 U.S.C. 154(b) by 51 days.

(21) Appl. No.: 16/486,802

(22) PCT Filed: Feb. 1, 2018

(86) PCT No.: PCT/CN2018/074891
§ 371 (c)(1),
(2) Date: Aug. 16, 2019

(87) PCT Pub. No.: WO2018/149303
PCT Pub. Date: Aug. 23, 2018

(65) Prior Publication Data
US 2019/0367678 A1    Dec. 5, 2019

(30) Foreign Application Priority Data
Feb. 16, 2017 (CN) .......................... 201710083465.1

(51) Int. Cl.
*C08G 73/10* (2006.01)
*C08L 79/08* (2006.01)

(52) U.S. Cl.
CPC .......... *C08G 73/1067* (2013.01); *C08L 79/08* (2013.01); *C08L 2203/12* (2013.01); *C08L 2203/16* (2013.01); *C08L 2203/20* (2013.01)

(58) Field of Classification Search
CPC . C08G 73/1067; C08G 73/1039; C08L 79/08; C08L 2203/12; C08L 2203/16; C08L 2203/20; C08J 2379/08; C08J 5/18
See application file for complete search history.

(56) References Cited

U.S. PATENT DOCUMENTS

| 5,403,908 A | * | 4/1995 | Watanabe | ............... C08F 12/04 |
| | | | | 526/284 |
| 2002/0103385 A1 | | 8/2002 | Yoon et al. | |

FOREIGN PATENT DOCUMENTS

| CN | 104341311 | | 2/2015 | |
| CN | 104341593 | | 2/2015 | |
| CN | 104341593 A | * | 2/2015 | ............. C08G 73/10 |
| CN | 107057065 | | 8/2017 | |
| WO | 2006070728 | | 7/2006 | |

* cited by examiner

*Primary Examiner* — Robert S Jones, Jr.
(74) *Attorney, Agent, or Firm* — WPAT, PC

(57) ABSTRACT

The invention discloses a polymer with a low dielectric constant and a molecular structure design method capable of reducing the dielectric constant of the polymer. A straight-chain rigid group is introduced into a meta-position of a side group benzene ring or diphenyl chain segment structure by using the designability of a molecular chain side group of a polymer; and a free volume hole with a larger size is formed in the material through loose rotation of the side group benzene ring to inhibit molecular chain deposition, thereby reducing the dielectric constant of the polymer material. The design method is simple, is suitable for a common high-performance polymer material, can be applied to preparation of a low-dielectric polymer material, is suitable for the field of new and high technology industries such as electronics, microelectronics, information and aerospace and is especially suitable for the field of super-large-scale integrated circuits.

5 Claims, 2 Drawing Sheets

POLYMER WITH LOW DIELECTRIC CONSTANT AND MOLECULAR STRUCTURE DESIGN METHOD CAPABLE OF REDUCING DIELECTRIC CONSTANT OF POLYMER

FIELD OF THE INVENTION

The present invention relates to the field of material science, an particularly to a polymer with a low dielectric constant and a molecular structure design method capable of reducing a dielectric constant of a polymer.

BACKGROUND OF THE INVENTION

High density, high speed, multifunctional and high-performance ultra-large-scale integrated circuit (ULSI) requires large chip area and small characteristic size. To this end, it is necessary to increase wiring density and to decrease the width of metal wire and the distance between wires. Device density and wire density are increased significantly, such that the resistance and capacitive coupling between wires in an interconnection system are increased sharply. Delay or even distortion of signal transmission, increase in interference noise, and increase in power dissipation become bottleneck for further development of high-performance ultra-large-scale integrated circuit (ULSI). According to calculation formula model and related theory for signal transmission delay (RC) and power (P), the solution to the problem of reducing the RC delay of the integrated circuit and reducing the power (P) is relying on the development and application of new low-dielectric interlay materials.

As known from the Clausius-Mossotti equation, the most effective method to reduce the dielectric constant of a material is to increase the internal void of the material. However, when the internal void of the material is increased, other properties (such as mechanical property, thermal stability and moisture absorption) of the material may be deteriorated. Free volume present in bulk polymer material is an intrinsic property of a polymer, and is considered as intrinsic voids of the polymer material. The intrinsic voids have a size on the order of sub-nanometer, and are uniformly dispersed in the interior of the material. The size of the voids is closely related to the polymer chain structure, and has less influence on the stability of the overall performance of the material.

The free volume of a polymer material can be reduced by designing the molecular chain structure thereof. For example, patents CN105622834A and CN105860075A disclose that the dielectric constant of a polymer material is effectively reduced by introducing a fluorine-containing component in the polymer molecular structure to inhibit close packing of material molecules. However, the introduction of a large amount of fluorine-containing component will result in decrease in the bonding property of the material, and hydrofluoric acid released at high temperature is very corrosive and has a poor environmental friendliness. Therefore, the fluorine-containing component cannot be used in the field of precise electronic devices. Patent CN105461924A and CN1302254 disclose that the dielectric constant of a material is also reduced to some extent by introducing a large-volume group in the polymer molecular structure to impede close packing of molecules. However, the polymer molecular structure designed by this method is complex, which will inevitably result in significant increase in process complexity of material production and production cost. As a result, it is difficult to achieve a large-scale industrial production. In addition, the dielectric constant of a polymer material can also be reduced by a physical pore-forming method, such as micro-foaming and addition of pore-forming agent. However, such methods will result in decrease in the mechanical property of the material, increase in the water absorption, and so on, which will influence the practical application value of the material.

SUMMARY OF THE INVENTION

An object of the present invention is to provide a polymer with a low dielectric constant and a molecular structure design method capable of reducing a dielectric constant of a polymer, which has advantages of simple process, low cost, easy industrial production and so on.

The object of the present invention is achieved by the following technical solutions. A polymer with a low dielectric constant, having a molecular structure consisting of a main chain structure and a side group structure, characterized in that, the side group structure has a benzene ring or diphenyl chain segment linked to the main chain structure, and a substituent having a rigid straight-chain structure is provided on a meta-position of the benzene ring or diphenyl chain segment.

The side group structure comprises one or more structures represented by general structure formula I or II:

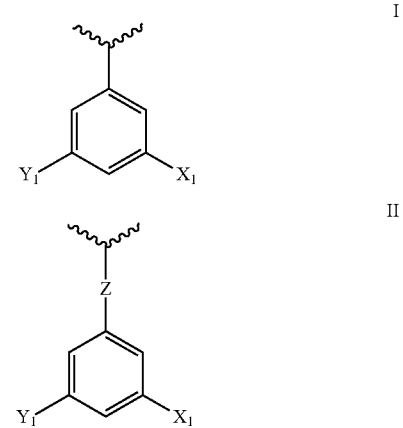

wherein $X_1$ is selected from any one of structures represented by the following structure formulae and $0 \leq n < 10$:

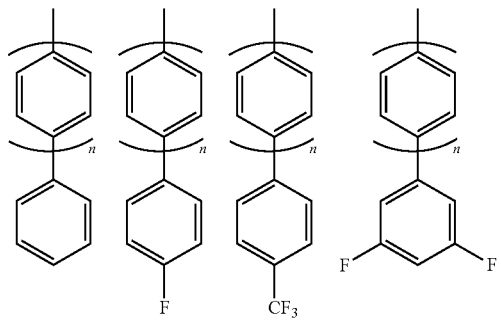

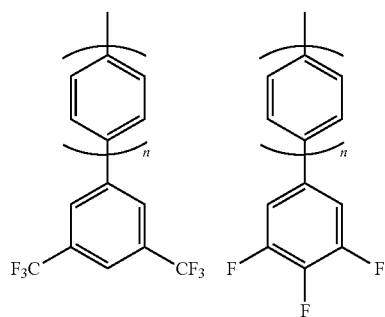
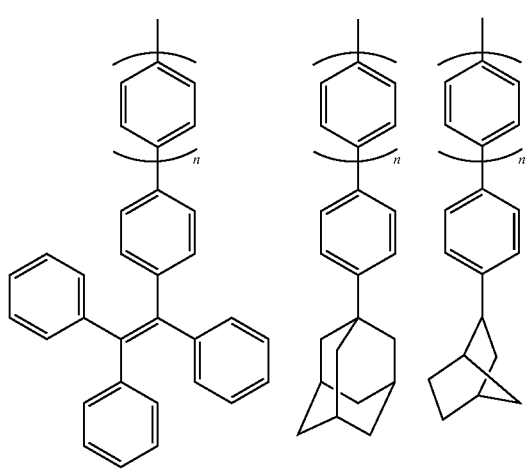
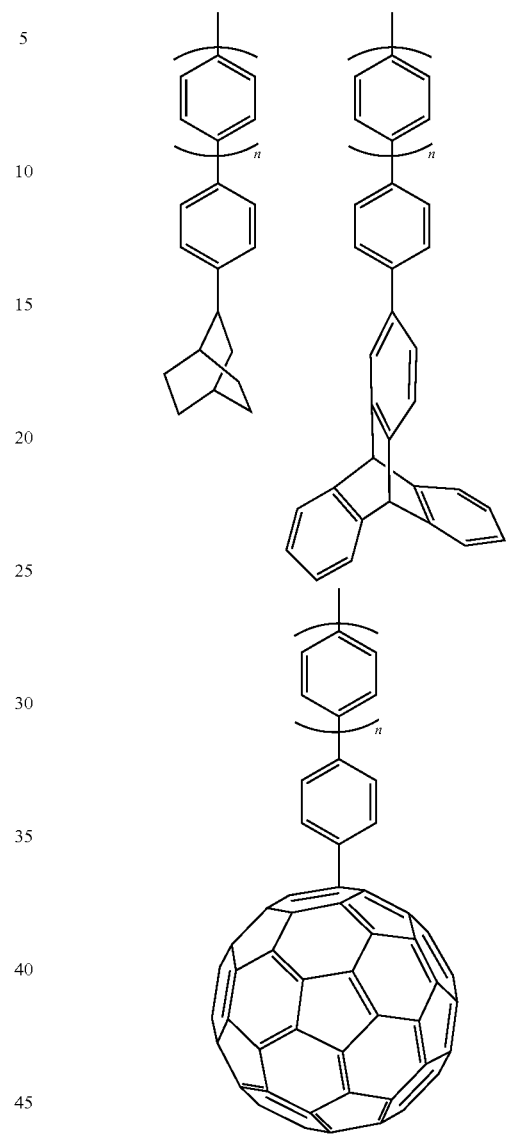
Y₁ is selected from any one of structures represented by the following structure formulae and 0≤n<10:
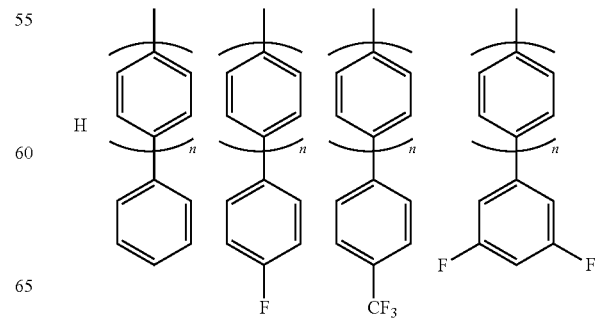

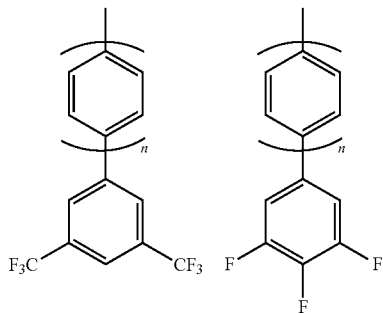

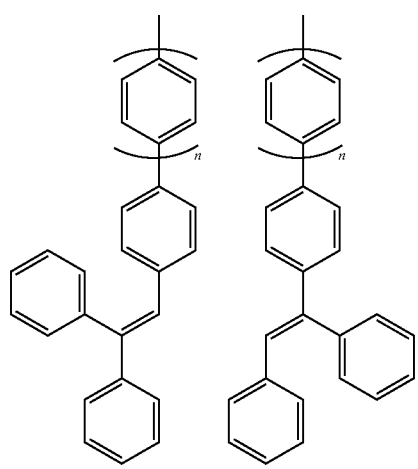

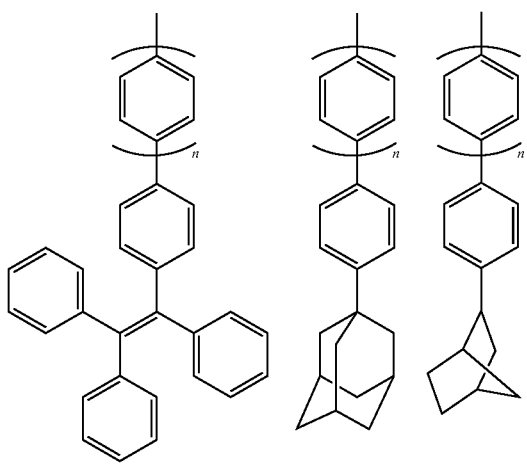

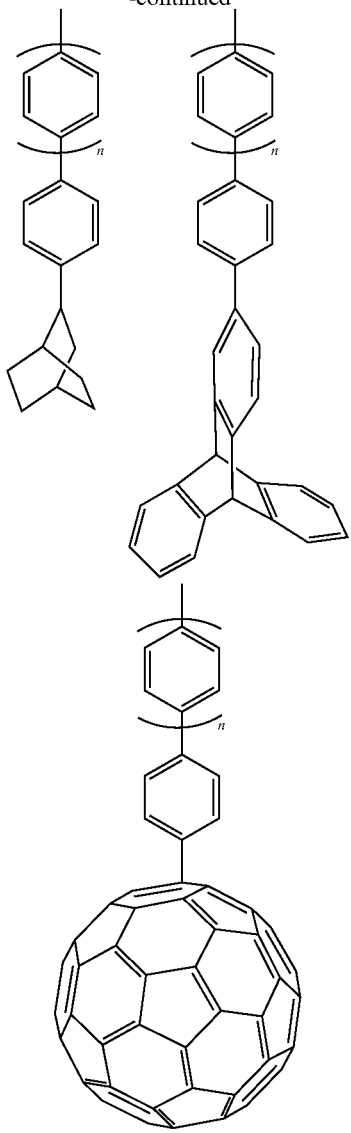

Z is selected from any one of structures represented by the following structure formula and 0≤m<10:

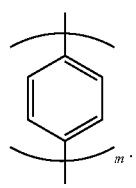

A molecular structure design method capable of reducing a dielectric constant of a polymer, characterized in that, a side group structure is introduced on a main chain structure of the polymer, the side group structure having a benzene ring or diphenyl chain segment linked to the main chain structure, and a substituent having a rigid straight-chain structure is provided on a meta-position of the benzene ring or diphenyl chain segment.

In the present invention, a straight-chain rigid group is introduced into a meta-position of a side group benzene ring or diphenyl chain segment structure by using the diverse designability of a molecular chain side group of a polymer; and a free volume hole with a larger size is formed in the material through relaxation rotation of the side group benzene ring to inhibit molecular chain packing, thereby reducing the dielectric constant of the polymer material. The method is simple and is suitable for a common high-performance polymer material. The resulting polymer material has a significantly reduced dielectric constant, and is easy to realize industrial production. The polymer with a low dielectric constant obtained in the present invention can be applied to preparation of a low-dielectric material, is suitable for the field of new and high technology industries such as electronics, microelectronics, information and aerospace and is especially suitable for the field of ultra-large-scale integrated circuits.

DETAILED DESCRIPTION OF THE INVENTION

Figure 1:
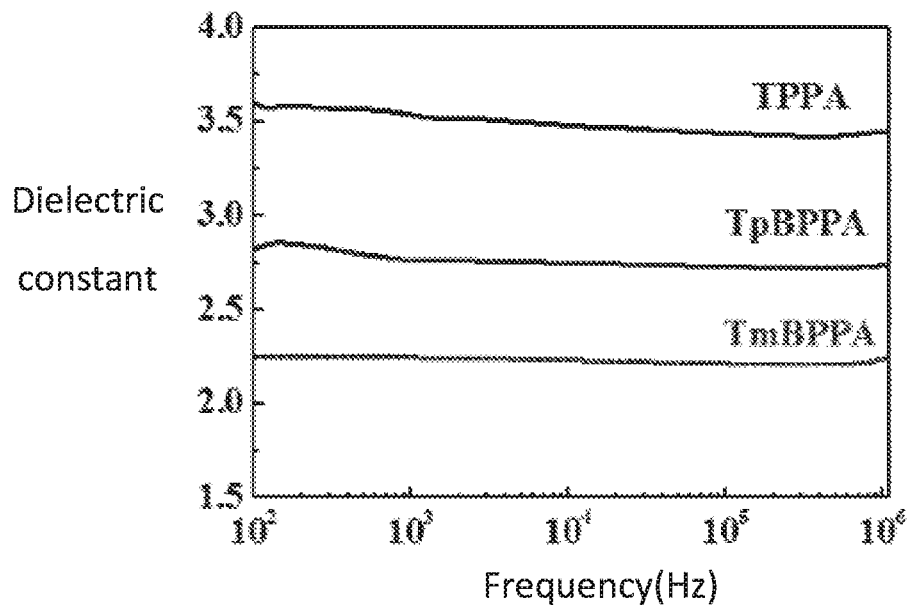
FIG. 1 shows dielectric constants of the polymer thin films TmBPPA, TPPA, and TpBPPA at different frequencies. As can be seen from the figure, when the frequency is 10000 Hz, the dielectric constant of the polymer thin film TmBPPA is 2.23, the dielectric constant of the polymer thin film TPPA is 3.59, and the dielectric constant of the polymer thin film TpBPPA is 2.76.

The present invention provides a polymer with a low dielectric constant, having a molecular structure consisting of a main chain structure and a side group structure, characterized in that, the side group structure contains a benzene ring or diphenyl chain segment linked to the main chain structure, and a substituent having a rigid straight-chain structure is provided on a meta-position of the benzene ring or diphenyl chain segment.

For the polymer molecular chain, there are several relaxation movement stages at different temperatures. Here, the temperature corresponding to the relaxation movement of the main chain segment of a molecule is known as the glass transition temperature, and the temperature corresponding to the relaxation rotation of the side group benzene ring is known as the β relaxation temperature. Because the β relaxation temperature is much lower than the glass transition temperature, when the polymer material is used at its glass transition temperature, the side group benzene ring on the main chain of the molecule can still relaxedly rotate with the main chain segment of the polymer frozen, the close packing of molecular chains can be inhibited by making use of this kind of dynamic rotation in combination with structure design, so as to obtain more free volume.

Therefore, a method, in which a side group structure is introduced into a main chain structure of the polymer, the side group structure containing a benzene ring or diphenyl chain segment, and a substituent having a rigid straight-chain structure is provided on a meta-position of the benzene ring or diphenyl chain segment, wherein the side group structure is linked to the main chain structure via its benzene ring or diphenyl chain segment, is a molecular structure design method capable of reducing a dielectric constant of a polymer.

The side group structure comprises one or more structures represented by general structure formula I or II:

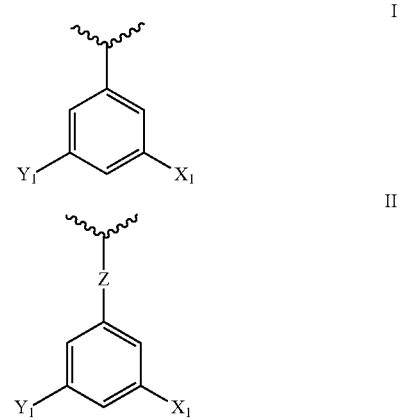

wherein $X_1$ is selected from any one of structures represented by the following structure formulae and $0 \le n < 10$:

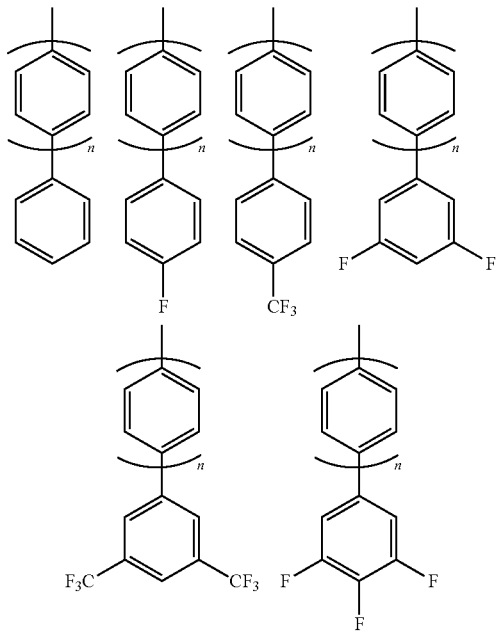

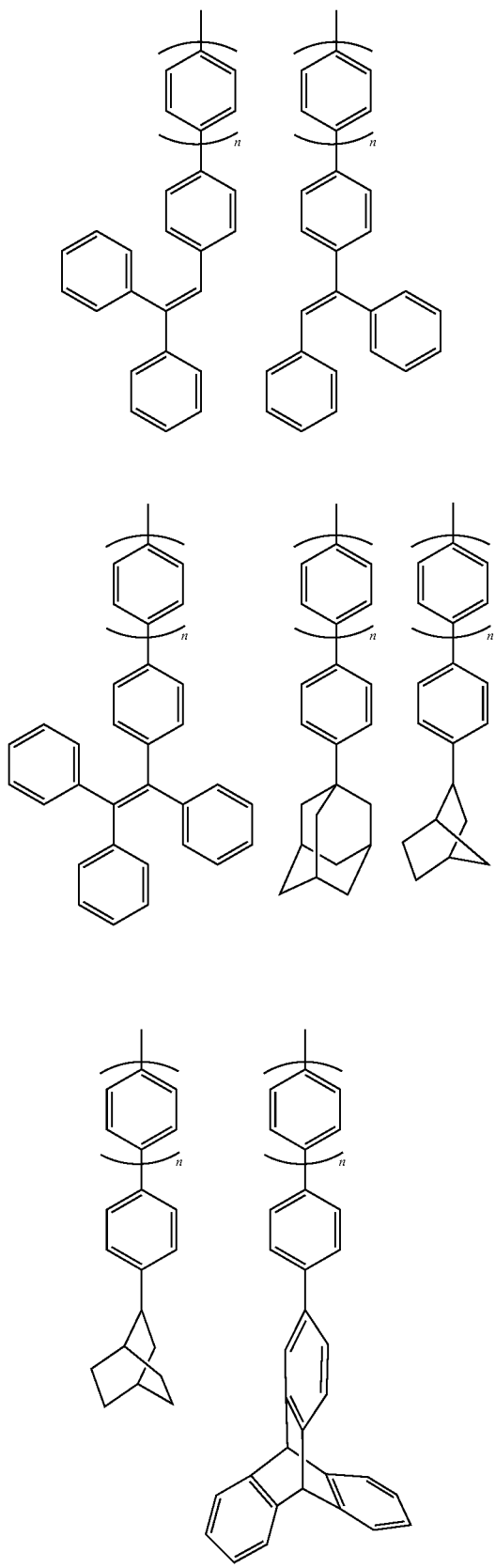
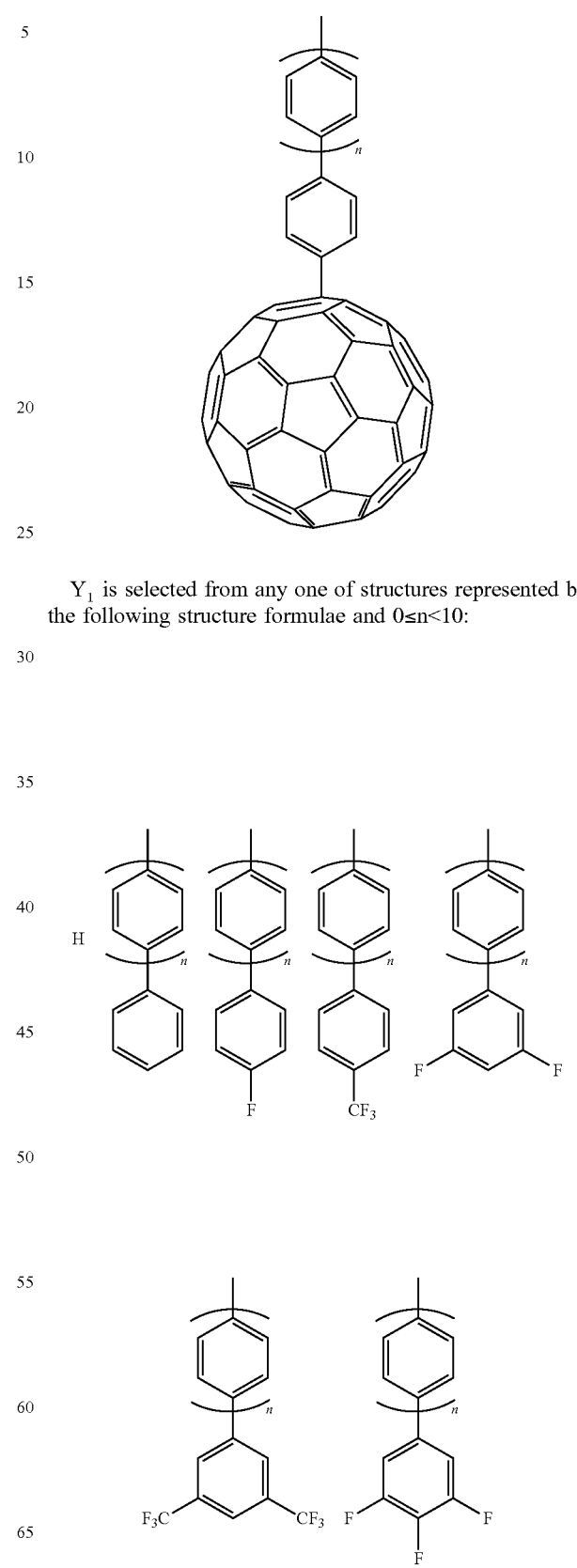
$Y_1$ is selected from any one of structures represented by the following structure formulae and $0 \leq n < 10$:

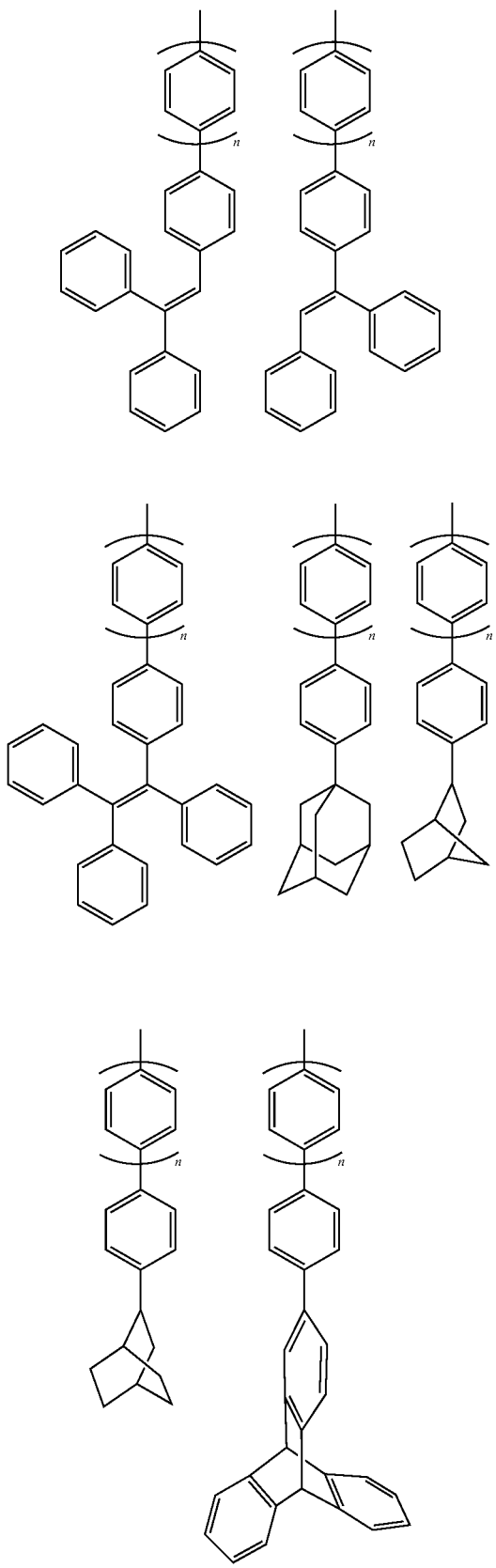

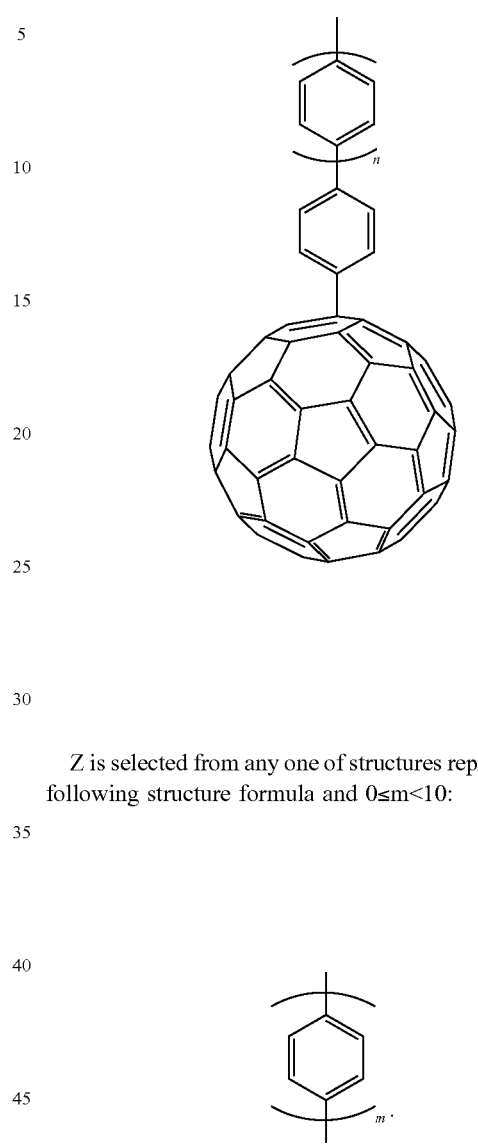

Z is selected from any one of structures represented by the following structure formula and 0≤m<10:

The main chain structure of the polymer may be selected from all aromatic polymer structures, heterocyclic polymer structures or alkyl-chain polymer structures. The polymer may be a powder material, a fiber material, or a thin film material, and can be used for preparing a low-dielectric polymer material due to its low dielectric constant.

The present invention will be described in more detail below by way of examples. It should be noted that the following examples cannot be construed as limiting the protection scope of the invention. Some non-substantive modifications and changes made by those skilled in the art according to the above-mentioned contents of the invention still fall within the protection scope of the invention.

Example 1

The molecular structure formula of the polymer thin film TmBPPA in the present example is as shown below:

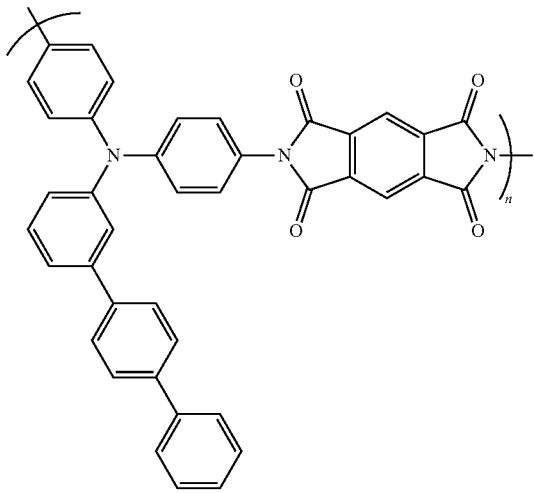

A side group benzene ring substituted with a diphenyl group at a meta-position was introduced into the molecular structure of a polyimide material containing triphenylamine and PMDA structures. The dielectric property of the polymer thin film was characterized with an impedance analyzer, and was compared to those of a polymer thin films without a substituent at a meta-position of the side group benzene ring (TPPA) and a polymer thin film with a side group benzene ring substituted at a para-position (TpBPPA) (as shown in FIG. 1). As compared to the other two polymer thin films, the dielectric constant of the polymer thin film with a side group benzene ring substituted with a diphenyl group at a meta-position was significantly reduced to as low as 2.23.

Example 2

The molecular structure formula of the polymer thin film TmBPHF in the present example is as shown below:

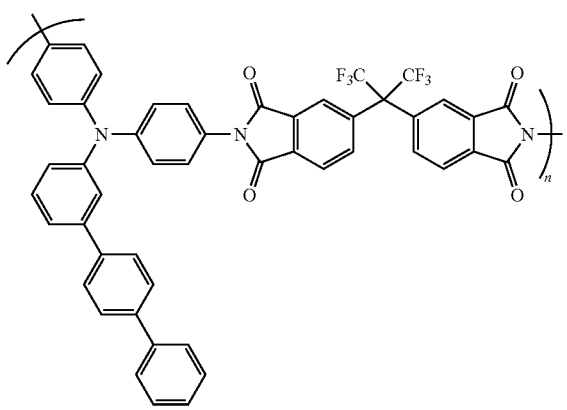

Figure 2:
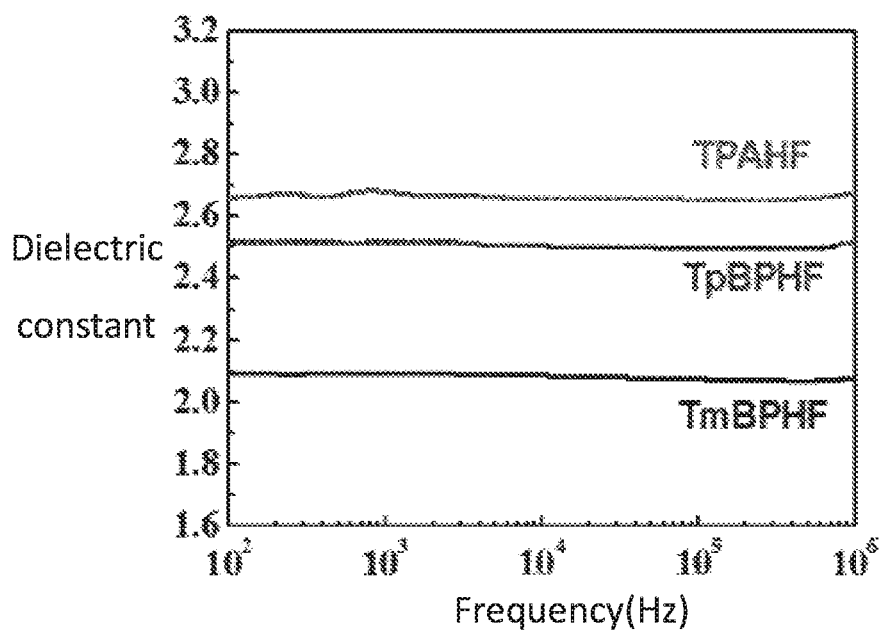
FIG. 2 shows dielectric constants of the polymer thin films TmBPHF, TPAHF, and TpBPHF at different frequencies. As can be seen from the figure, when the frequency is 10000 Hz, the dielectric constant of the polymer thin film TmBPHF is 2.09, the dielectric constant of the polymer thin film TPAHF is 2.65, and the dielectric constant of the polymer thin film TpBPHF is 2.51.

A side group benzene ring substituted with a diphenyl group at a meta-position was introduced into the molecular structure of a polyimide material containing triphenylamine and 6FDA structures. The dielectric property of the polymer thin film was characterized with an impedance analyzer, and was compared to those of a polymer thin films without a substituent at a meta-position of the side group benzene ring (TPAHF) and a polymer thin film with a side group benzene ring substituted at a para-position (TpBPHF) (as shown in FIG. 2). As compared to the other two polymer thin films, the dielectric constant of the polymer thin film with a side group benzene ring substituted with a diphenyl group at a meta-position was significantly reduced to as low as 2.09.

Example 3

The molecular structure formula of the polymer thin film TM3BPhHF in the present example is as shown below:

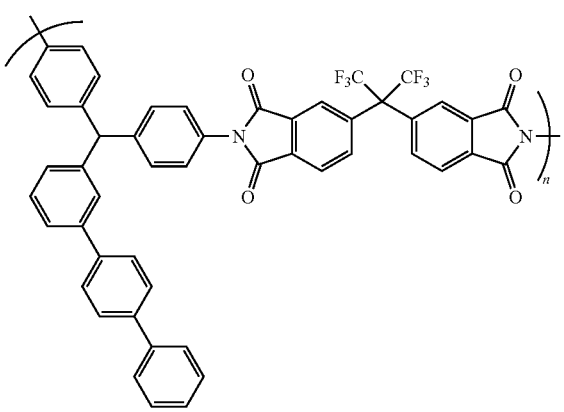

Figure 3:
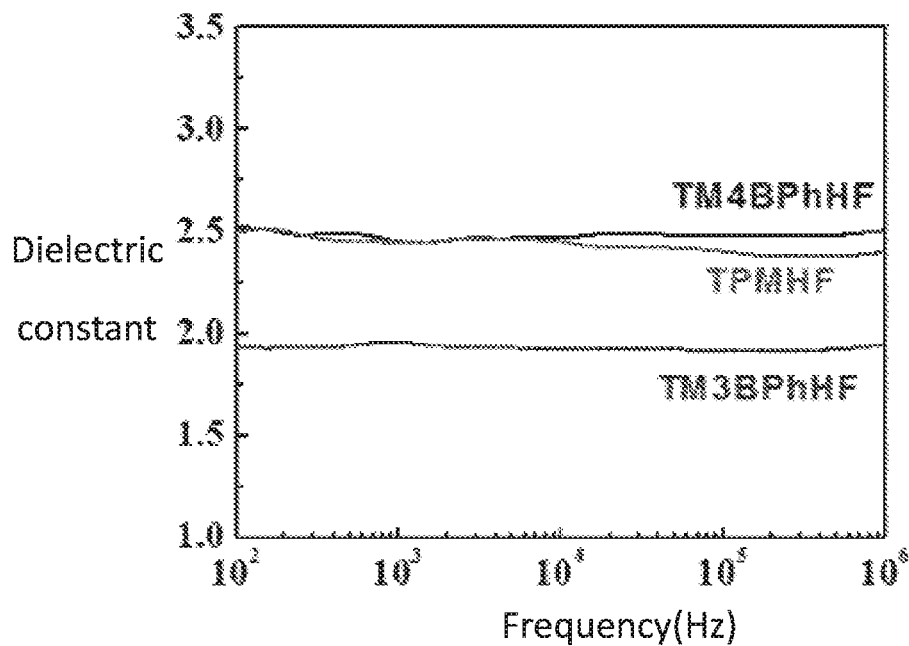
FIG. 3 shows dielectric constants of the polymer thin films TM3BPhHF, TPMHF, and TM4BPhHF at different frequencies. As can be seen from the figure, when the frequency is 10000 Hz, the dielectric constant of the polymer thin film TM3BPhHF is 1.92, the dielectric constant of the polymer thin film TPMHF is 2.45, and the dielectric constant of the polymer thin film TM4BPhHF is 2.46.

A side group benzene ring substituted with a diphenyl group at a meta-position was introduced into the molecular structure of a polyimide material containing triphenylmethane and 6FDA structures. The dielectric property of the polymer thin film was characterized with an impedance analyzer, and was compared to those of a polymer thin films without a substituent at a meta-position of the side group benzene ring (TPMHF) and a polymer thin film with a side group benzene ring substituted at a para-position (TM4BPhHF) (as shown in FIG. 3). As compared to the other two polymer thin films, the dielectric constant of the polymer thin film with a side group benzene ring substituted with a diphenyl group at a meta-position was significantly reduced to as low as 1.92.

Example 4

The molecular structure formula of the polymer thin film TM35Ph2CF$_3$HF in the present example is as shown below:

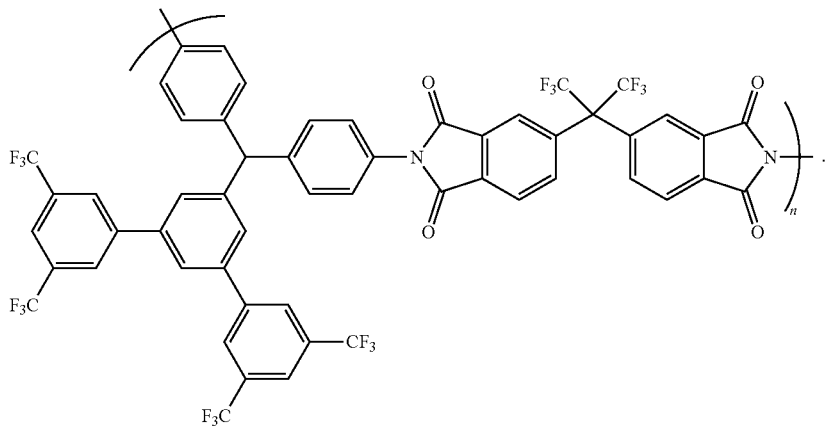

Figure 4:
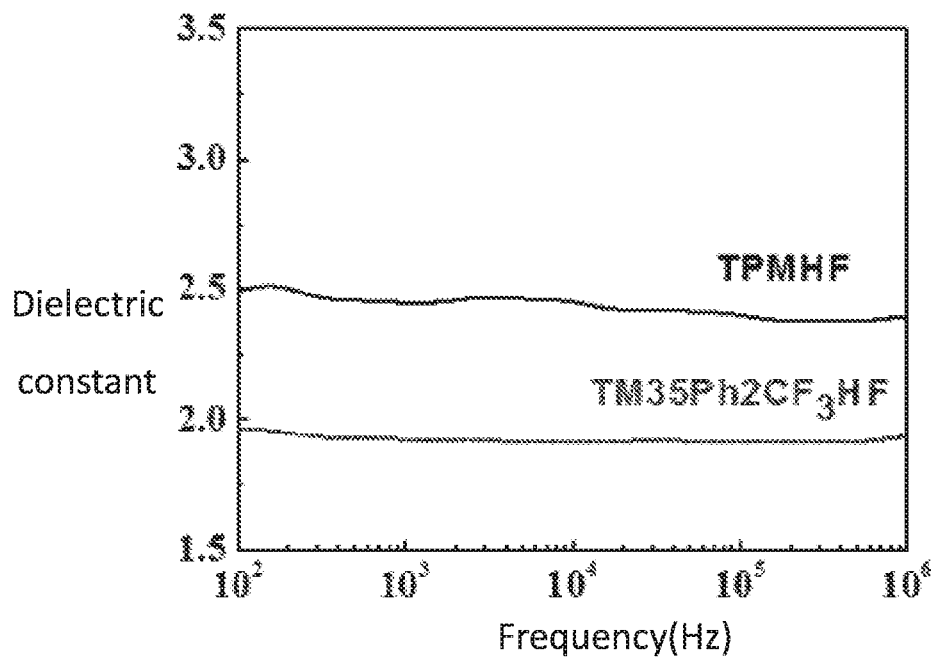
FIG. 4 shows dielectric constants of the polymer thin films TPMHF and TM35Ph2CF3HF at different frequencies. As can be seen from the figure, when the frequency is 10000 Hz, the dielectric constant of the polymer thin film TM35Ph2CF3HF is 1.91, and the dielectric constant of the polymer thin film TPMHF is 2.45.

A side group benzene ring disubstituted with fluorine-containing groups at both meta-positions was introduced into the molecular structure of a polyimide material containing triphenylmethane and 6FDA structures. The dielectric property of the polymer thin film was characterized with an impedance analyzer, and was compared to that of a polymer thin films without a substituent at a meta-position of the side group benzene ring (TPMHF) (as shown in FIG. 4). As compared to the polymer thin film without a substituent at a meta-position of the side group benzene ring, the dielectric constant of the polymer thin film with a side group benzene ring disubstituted with fluorine-containing groups at both meta-positions was significantly reduced to as low as 1.91.

The invention claimed is:

1. A polymer having a molecular structure consisting of a main chain structure and a side group structure, wherein the side group structure has a benzene ring or diphenyl chain segment linked to the main chain structure, and a substituent having a rigid straight-chain structure is provided on a meta-position of the benzene ring or diphenyl chain segment;

wherein a molecular structure formula of the polymer is:

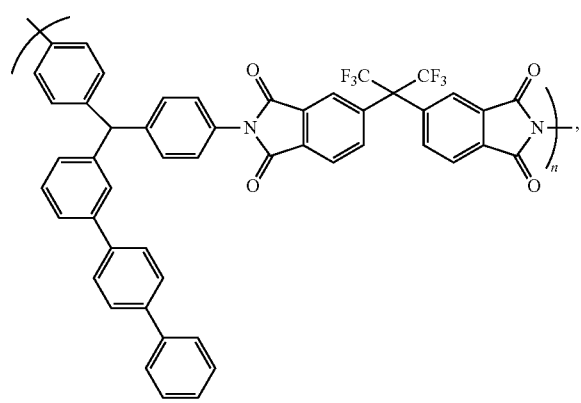

-continued or

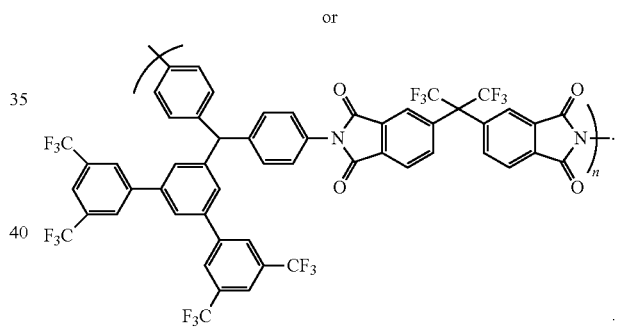

2. The polymer according to claim 1, wherein the polymer is in a form of a powder material, a fiber material, or a thin film material.

3. A method of using the polymer according to claim 1 in preparing a polymer material.

4. A molecular structure design method capable of reducing a dielectric constant of a polymer, wherein a side group structure is introduced on a main chain structure of the polymer, the side group structure having a benzene ring or diphenyl chain segment linked to the main chain structure, and a substituent having a rigid straight-chain structure is provided on a meta-position of the benzene ring or diphenyl chain segment;

wherein a molecular structure formula of the polymer is:
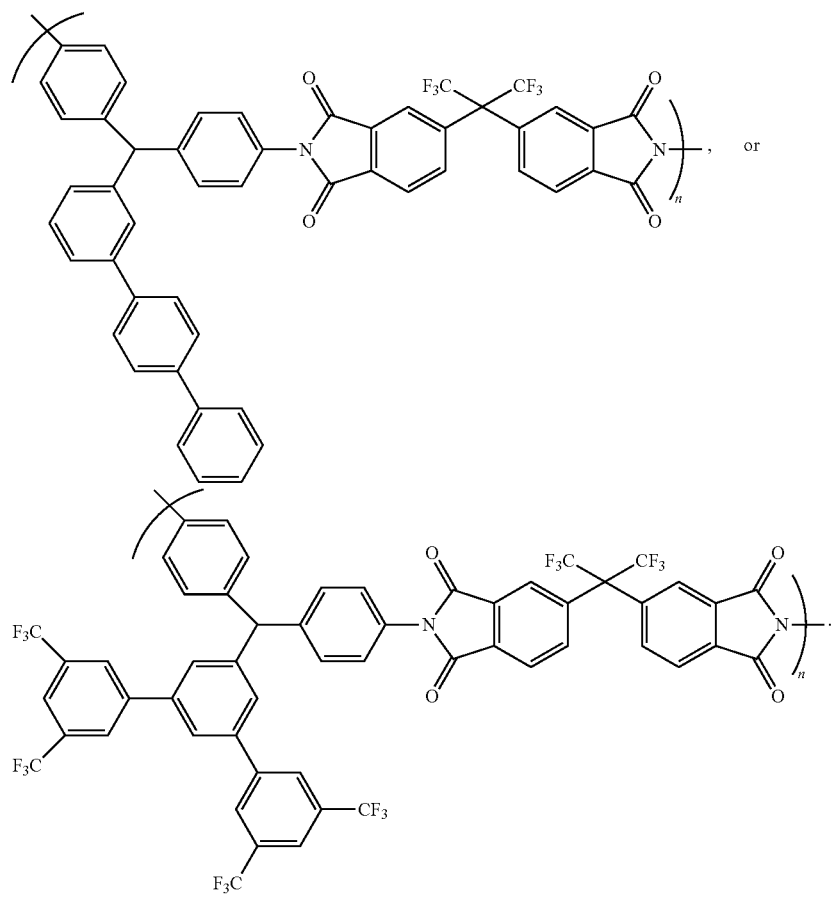
5. The molecular structure design method capable of reducing a dielectric constant of a polymer according to claim 4, wherein the polymer is in a form of a powder material, a fiber material, or a thin film material.
* * * * *